Nov. 4, 1969 MASAHIKO KAJITANI 3,476,884

AUTOMATIZED MAGNETIC RECORDING AND REPRODUCING APPARATUS

Filed May 15, 1967 5 Sheets-Sheet 1

INVENTOR

Masahiko Kajitani

BY Stevens, Davis, Miller & Mosher

ATTORNEYS

AUTOMATIZED MAGNETIC RECORDING AND REPRODUCING APPARATUS

Filed May 15, 1967 5 Sheets-Sheet 2

INVENTOR
Masahiko Kijatini
BY Stevens Davis Miller & Mosher
ATTORNEYS

Nov. 4, 1969 MASAHIKO KAJITANI 3,476,884

AUTOMATIZED MAGNETIC RECORDING AND REPRODUCING APPARATUS

Filed May 15, 1967 5 Sheets-Sheet 3

INVENTOR

Masahiko Kajitani

BY Stevens Davis Miller & Mosher

ATTORNEYS

Nov. 4, 1969 MASAHIKO KAJITANI 3,476,884

AUTOMATIZED MAGNETIC RECORDING AND REPRODUCING APPARATUS

Filed May 15, 1967 5 Sheets-Sheet 4

INVENTOR

Masahiko Kajitani

BY Stevens, Davis, Miller & Mosher

ATTORNEYS

INVENTOR
Masahiko Kajitani
BY Stevens, Davis, Miller & Mosher
ATTORNEYS

United States Patent Office 3,476,884

Patented Nov. 4, 1969

3,476,884
AUTOMATIZED MAGNETIC RECORDING AND REPRODUCING APPARATUS

Masahiko Kajitani, Osaka, Japan, assignor to Matsushita Electric Industrial Co., Ltd., Osaka, Japan, a corporation of Japan Continuation-in-part of application Ser. No. 245,102, Dec. 17, 1962. This application May 15, 1967, Ser. No. 638,301

Claims priority, application Japan, Dec. 19, 1961, 36/62,802, 36/62,803; June 9, 1962, 37/24,063

Int. Cl. G11b 5/78

U.S. Cl. 179—100.2 6 Claims

ABSTRACT OF THE DISCLOSURE

This specification discloses an automatized magnetic recording and reproducing apparatus for recording a series of signals on an endless tape, accumulating the tape having signals recorded thereon in a tape reservoir case during recording and after the termination of recording, pulling out the tape accumulated in the tape reservoir case and reproducing said signals recorded thereon.

Cross-references to related applications

This application is a continuation-in-part application of Ser. No. 245,102 filed on Dec. 17, 1962, now abandoned.

Background of the invention

The present invention relates to a magnetic recording and reproducing apparatus, and particularly to an automatic apparatus of the kind in which a series of signals of various lengths of time may be recorded on a magnetic tape, and such records may be reproduced immediately after recording without need of any manual operation, and which is adapted for use in training or exercise of linguistic speaking, debating, announcing, confirmation of the contents of communication, etc., in any way effective for recording a series of signals on a magnetic tape and for reproducing the same immediately after the above recording automatically or without need of any manual operation for effecting the reproduction. In addition, according to the invention, a signal recorded on the tape may be played back for an indefinite number of times repetitively or in an endless manner automatically. This greatly enhances the utility of the present apparatus, and promises broader fields of applications.

Summary of the invention

The present invention is characterized mainly by the following features:

(1) A series of input signals are recorded on a magnetic tape which, in turn, is inserted into a tape reservoir through its inlet for storing. After termination of the recording operation, the magnetic tape having signals recorded thereon is pulled out from the tape reservoir through its outlet automatically for reproduction of the recorded signals. The interval of time required from termination of recording to commencement of reproduction may be about one or two seconds, and such a length of time may be said to be negligible in most cases.

(2) For effecting recording and reproducing operations, rewinding of the magnetic tape is not necessary as in the conventional tape recorders, but an entirely automatic operation can attain the result. Recording starts when, and continues as long as the average level of input signals from a microphone or the like is above a predetermined value, but if the above-mentioned level is below another predetermined value continuously for a predetermined interval of time, the operation is changed automatically from recording to reproducing. As soon as the reproducing operation has been completed, the apparatus is readied for the next recording operation. Such a manner of operation is called Voice Operation. There is no fear that the beginning portion or the fore end of input signal to be recorded will be missed in the recording operation. Manual operation is not necessary, except for volume control if desired.

(3) Particularly when there is a temporary pause or a low-level portion in the series of signals being recorded that would cause change to an undesirable reproducing operation while recording in the Voice Operation described in item (2), a push-button switch may be provided for manual actuation during the recording operation to prevent such an automatic change to the reproducing operation. When the push-button is released after termination of recording, the reproducing operation is automatically started. The push-button switch may conveniently be a foot-switch, or be substituted by a remote control switch associated with the microphone, which would not burden the user substantially.

(4) The signal once recorded on the magnetic tape may be reproduced repetitively for an indefinite number of times in an endless manner.

Accordingly, the object of the present invention is to provide an automatic magnetic recording and reproducing apparatus having one or more of the above-enumerated characteristic features.

There are other objects and particularities of the present invention, which will be made obvious from the following detailed description of the preferred embodiment of the invention, with reference to the accompanying drawings.

Description of the preferred embodiment

Figure 1:
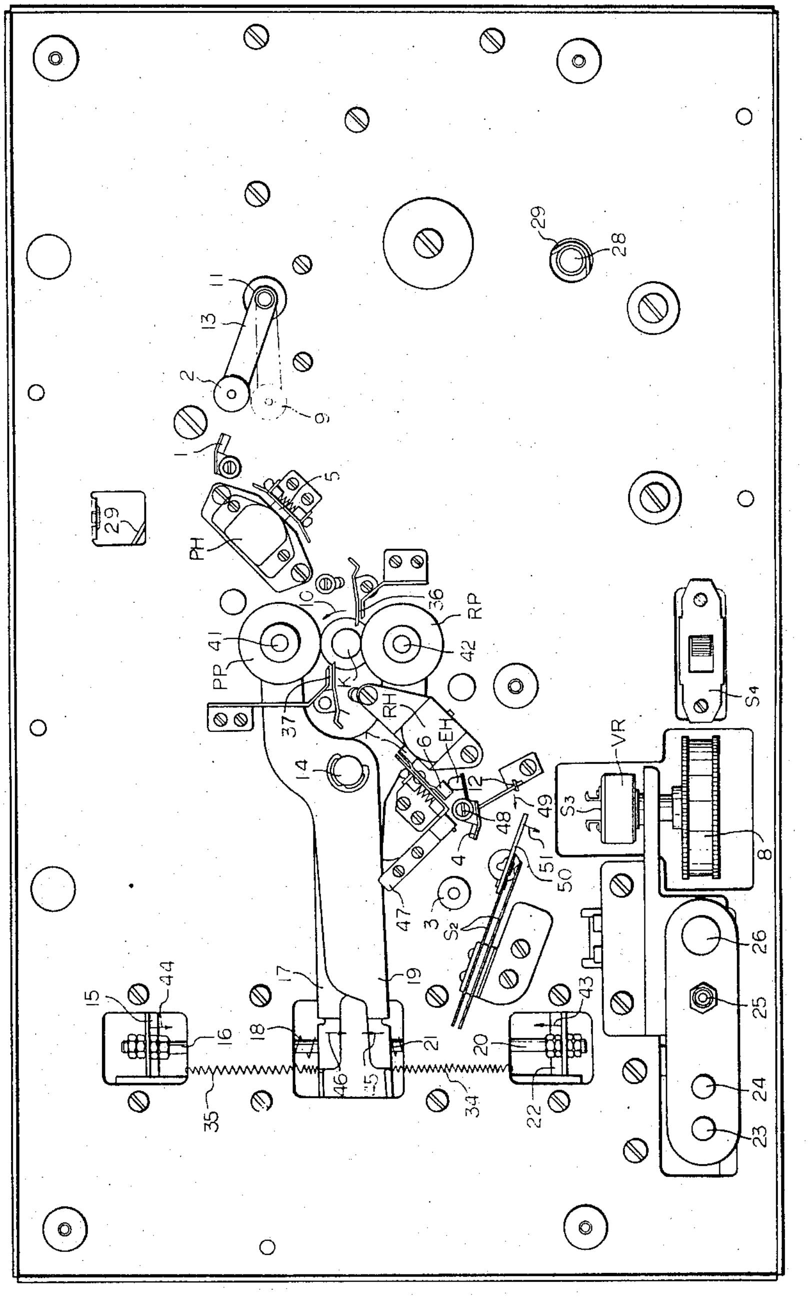
FIG. 1 is a plan view of an apparatus embodying the present invention showing the mechanism somewhat, diagrammatically.
Figure 2:
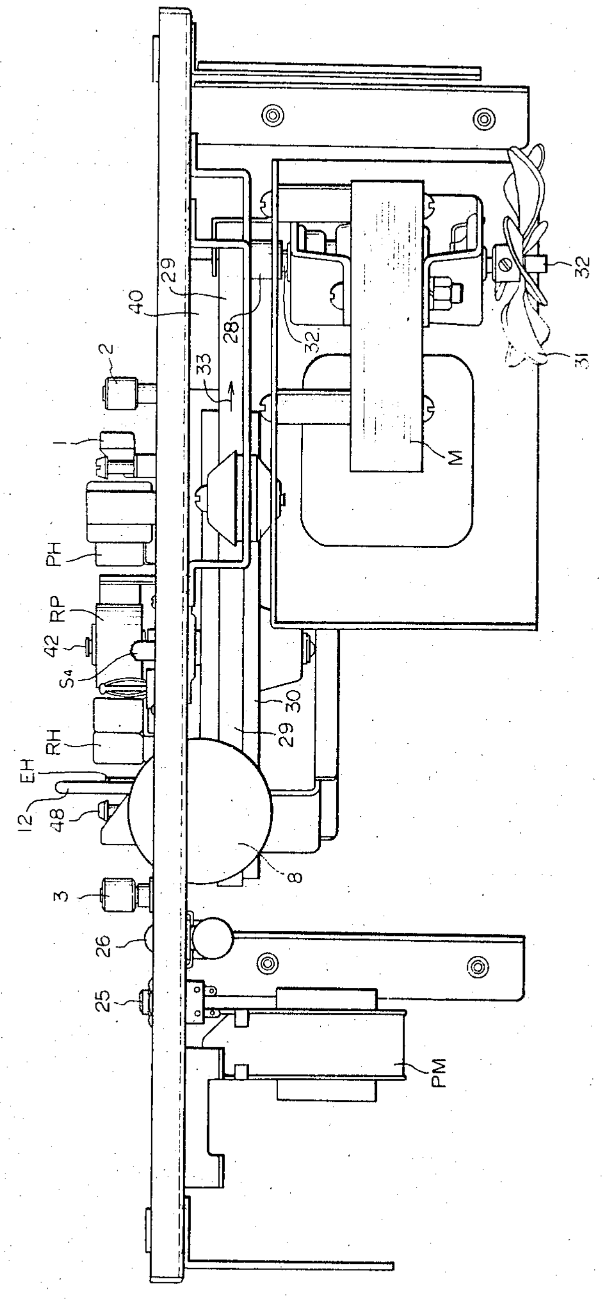
FIG. 2 is a front elevational view of the apparatus shown in FIG. 1.
Figure 3:
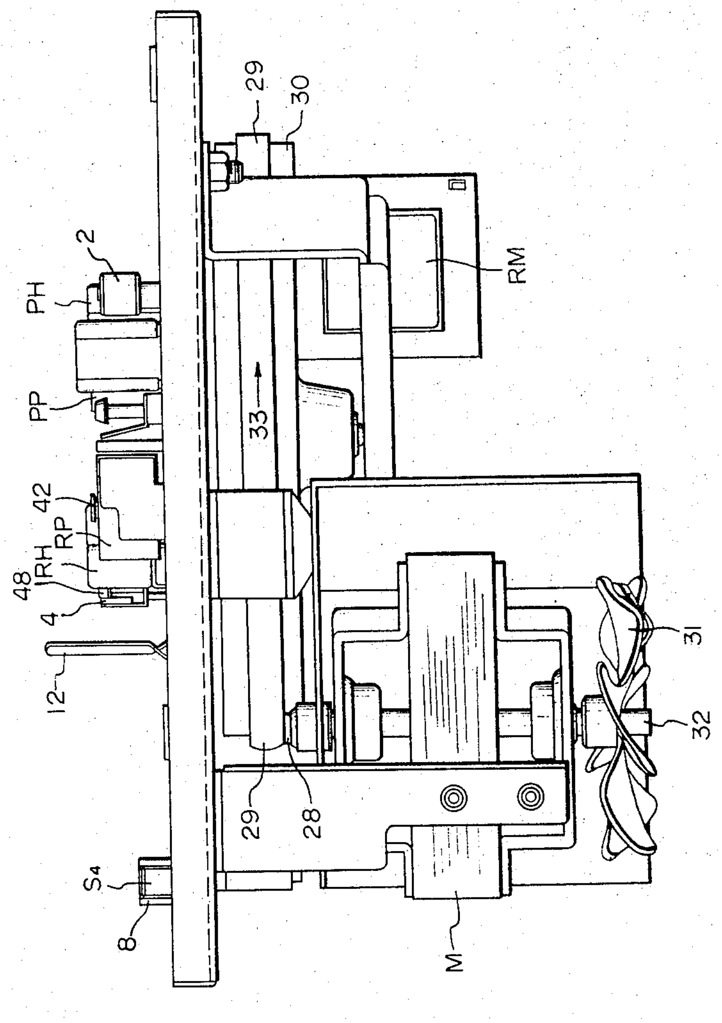
FIG. 3 is a side elevational view of the same seen from the right.

Referring to the drawings, a driving motor M has a rotating shaft 32 with its lower end carrying a ventilating fan 31, and its upper end carrying a motor pulley 28. A flywheel 30 has a rotating shaft with its projecting end serving as a capstan K. The fly-wheel 30 is driven by the motor M through a flexible belt 29 engaging the peripheries of fly-wheel 30 and motor pulley 28. When the motor M is energized to rotate, the belt 29 is moved in the direction shown by arrow 33 to rotate the capstan K at a constant speed in the direction shown by arrow 10. A reproducing pinch roller PP is provided, which, when urged against the rotating capstan K, drives the magnetic tape T pinched between them, whereby the tape T is pulled out from a tape reservoir case A2 through its outlet 38, and moved through between a reproducing magnetic head PH and a reproducing pad 5, and then fed into another tape reservoir case A1 through tape inlet 37. The pinch roller PP is rotatably mounted on a shaft 41 fixed to a reproducing pinch roller lever 19 which is pivotally mounted on a stationary shaft 14. The reproducing pinch roller lever 19 is normally biased by a spring 34 to hold the pinch roller PP apart from the capstan K.

When an electromagnet PM is energized, its plunger 22 is moved in the direction shown by arrow 43, and through a connecting bar 20 and a spring 21, applies a force to the reproducing pinch roller lever 19 in the direction shown by arrow 45, thus to urge the pinch roller PP against the capstan K.

RP is a recording pinch roller, and when it is urged against the rotating capstan K, the magnetic tape T pinched between them is driven, so that it is pulled out from the tape reservoir A1 through its outlet 39, and moved by way of a tape guide 48, through between an erasing head EH and an erasing pad 6, between a recording head RH and a recording pad 7, and fed into the tape reservoir A2 through tape inlet 36. The pinch roller RP is rotatably mounted on a shaft 42 fixed to a recording pinch roller lever 17 which is pivotally mounted on the stationary shaft 14, and normally biased by a spring 35 so that the pinch roller RP is kept apart from the capstan K. When an electromagnet RM is energized, its plunger 15 is moved in the direction shown by arrow 44, and through a plunger connecting bar 16 and a spring 18, applies a force in the direction shown by arrow 46 to the recording pinch roller lever 17, thus urging the pinch roller RP against the capstan K.

When the pinch roller RP is urged against the capstan K with the tape T pinched therebetween, the tape T is pulled out from the tape reservoir A1 through its outlet 39, and fed by way of tape guide 48 and back-tensioning pad 4, and through between erasing head EH and erasing pad 6, between recording head RH and recording pad 7, and between capstan K and pinch roller RP, into tape reservoir A2 through tape inlet 36.

The tape T is pulled out from tape reservoir A2 through its outlet 38, and fed by way of back-tensioning pad 1, and through between reproducing head PH and reproducing pad 5, and between capstan K and pinch roller PP, into tape reservoir A1 through tape inlet 37. The tape T forms an endless loop and is moved in an endless manner as above described.

A micro-switch 40 is provided and comprises a rotatable shaft 11 carrying a lever 13 secured thereto. The lever 13 carries a roller 2 at the free end. When the tape portion being pulled out through the tape outlet 38 is tensioned as shown by T1, thus forcing the roller 2 to displace to the position shown by 9, the micro-switch 40 breaks its contact S1. Near the tape outlet 39 of tape reservoir A1 is disposed a roller 3, in order that the tape is pulled out smoothly from the tape reservoir A1.

A volume control VR is provided with a knob 8. An input jack 23 is provided for connection thereto of a microphone or the like. Jack 24 is for remote control connection only for use of a manual control, and jack 25 is for output connection of an earphone, loudspeaker or the like. There is also provided an indicating pilot lamp 26 to show that the apparatus is in operation. A switch S2 is provided for changing continuous reproducing, S3 for connection of an electrical source to the apparatus and mounted on a volume control VR, and S4 for selecting between Voice Operation control or manual control.

The erasing head EH is formed by a permanent magnet and is connected with a continuous reproduction changing lever 12. When the lever 12 is rotated in the direction shown by arrow 49 by about 60 degrees from the position shown, the erasing head EH is moved apart from the tape T and becomes ineffective, and at the same time, an insulating plate 50 secured to the end of switch S2 is pushed in the direction shown by arrow 51 to close the switch S2.

A pad shifter 47 is operatively connected to the recording pinch roller lever 17, and when the recording pinch roller RP is kept apart from the capstan K, keeps the erasing pad 6 and the recording pad 7 apart from the respective magnetic heads for preventing the tape T under reproducing operation from being subjected to excessive tensioning.

Figure 5:
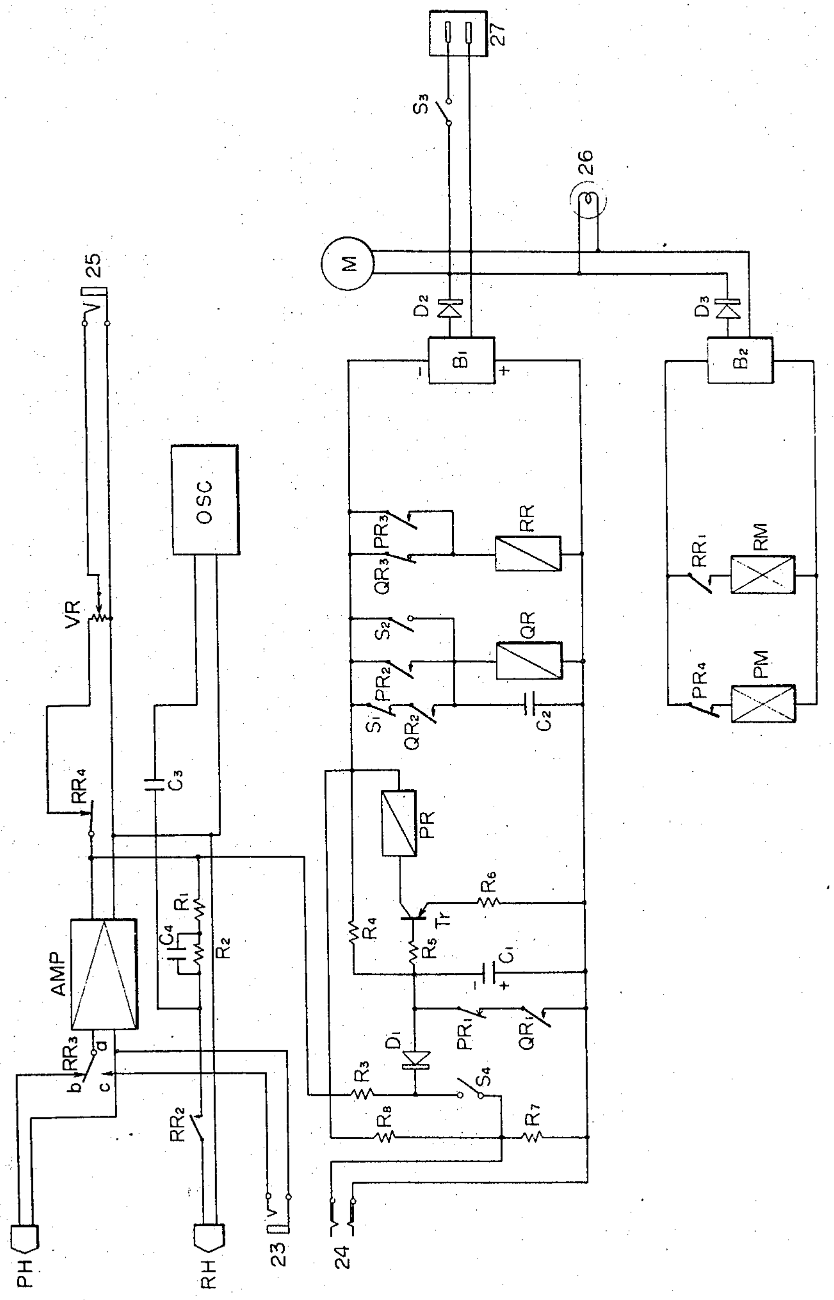
FIG. 5 is a circuit diagram of the electrical control system of the apparatus shown in FIGS. 1 to 4.

Referring to FIG. 5, electromagnets PM, RM, reproducing head PH, recording head RH, etc., are shown with associated electrical circuits. Direct current sources B1 and B2 may be storage batteries charged from an alternating current source to be connected to input terminals 27 through switch S3 and rectifiers D2 and D3, respectively. Driving motor M and pilot lamp 26 are also energized from the A.C. source through switch S3. The switch S3 is mounted on the voice volume control VR.

An amplifier transistor T*r* is provided, and between its collector and the negative terminal of D.C. source B1 is connected a relay PR. A relay QR is connected in parallel with D.C. source B1 through a make contact PR2 of relay PR. The micro-switch 40 has a contact S1 connected in series with a make contact QR2 of relay QR and in parallel with the make contact PR2, and is opened upon actuation of the switch 40. In parallel with the make contact PR2 is connected the switch contact S2 for the continuous reproducing operation.

A relay PR is connected across the D.C. source B1 through a break contact QR3 of relay QR or a make contact PR3 of relay PR, contacts QR3 and PR3 being connected parallel with each other. An amplifier AMP has its input side provided with a movable contact *a* of a transfer contact RR3 of relay RR. When the relay RR is deenergized, the contact *a* engages a fixed contact *b* connected to the reproducing head PH, while when the relay RR is energized, the contact *a* engages a fixed contact *c* connected to the microphone jack 23. The output side of amplifier AMP is connected to the output jack 25 through a break contact RR4 of relay RR and a volume control resistor VR, and also to the recording head RH through a resistance R1, parallel-connected resisttance R2 and capacitor C4, and a make contact RR2 of relay RR. A high frequency oscillator OSC for A.C. bias has its output connected to the junction point of resistance R2 and make contact RR2 through a capacitor C3.

A capacitor C1 is connected between the positive side of D.C. source B1 and a resistance R5 connected to the base of transistor T*r*, and a capacitor C2 is connected in shunt with the relay QR. A make contact QR1 of relay QR and a break contact PR1 of relay PR are series connected in shunt with the capacitor C1. A rectifier D1 is connected between the junction point of resistance R5 and capacitor C1 and a resistance R3 connected with the output side of amplifier AMP. A resistance R4 is inserted between the positive side of rectifier D1 and the negative side of D.C. source B1, and a resistance R6 is inserted between the emitter of transistor T*r* and the positive side of D.C. supply B1. The relay PR has also a break contact PR4 connected in series with the electromagnet PM and to the D.C. source B2, while the relay RR has a make contact RR1 connected in series with the electromagnet RM and to the D.C. source B2.

All the relay contacts are shown in FIG. 5 in position when their respective relays are deenergized.

Resistances R7 and R8 are series connected, and are connected across the D.C. source B1, with resistance R7 at the positive side, while resistance R8 is at the negative side. The junction point of resistance R7 and R8 is connected to one terminal of the remote control jack 24, the other terminal thereof being connected to the positive side of D.C. source B1. The Voice Operation changing switch S4 is inserted between the junction point of resistances R7 and R8 and the diode rectifier D1.

The operation of the present apparatus will now be described.

When the source switch S3 is closed, the driving motor M is started and the pilot lamp 26 shows that the apparatus is going to operate. D.C. sources B1 and B2 provide D.C. voltages of predetermined values.

Figure 4:
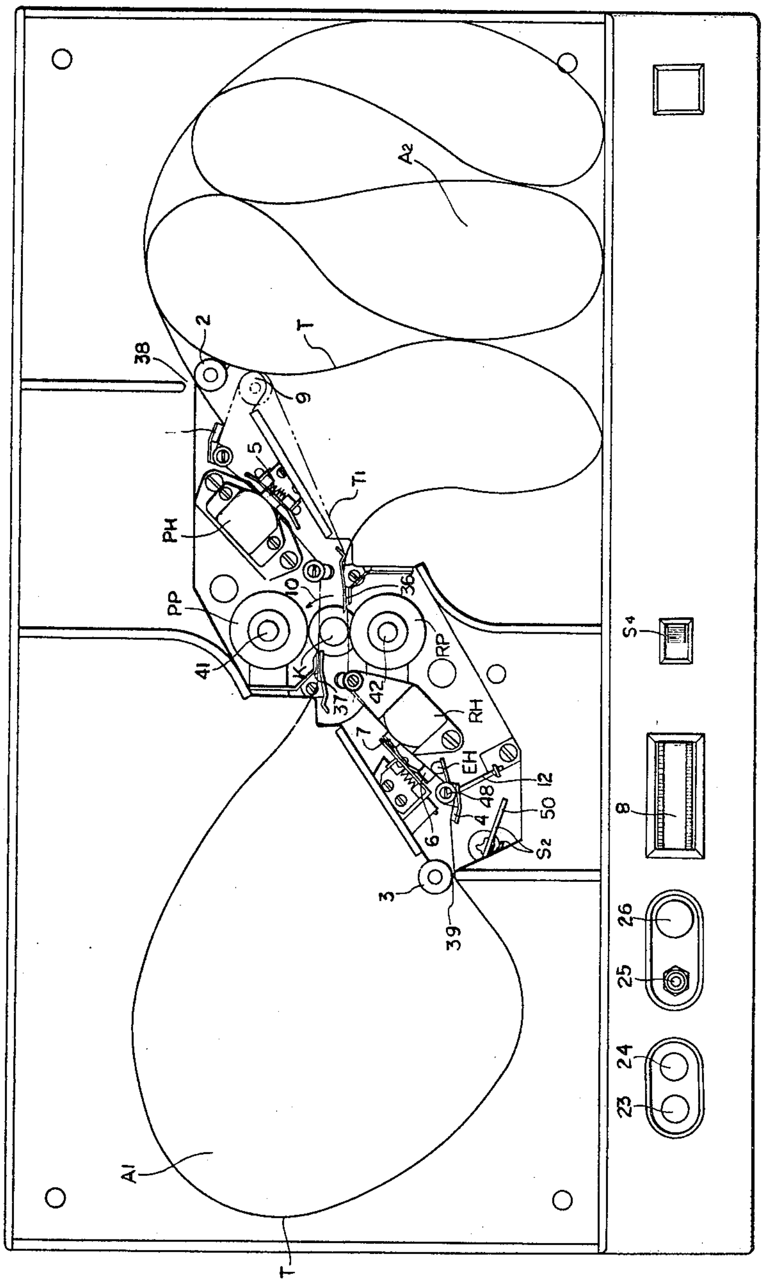
FIG. 4 is a plan view similar to FIG. 1 showing the tape reservoir and tape movement somewhat diagrammatically.

For Voice Operation, the Voice Operation changing switch S4 and the continuous reproducing switch S2 are maintained open. The resistance R4 is relatively large, and when the capacitor C1 has not yet been charged, there is substantially no base curent of transistor T*r*, and consequently the collector of transistor Tr is in the cutoff condition. The relay PR is not then energized, and its contact PR2 is open. Contact QR2 also is open, the relay QR is not energized, and its contact QR3 is closed. As a result the relay RR is energized. The break contact PR4 is in the closed position, and the electromagnet PM is energized to urge the pinch roller PP against the capstan K. Consequently, the magnetic tape T is pulled out from the tape reservoir case A2 and then pushed into the tape reservoir case A1. On the other hand, as the relay RR is energized, its contact RR1 is closed, and the electromagnet RM is energized from D.C. source B2. As a result, the pinch roller RP is urged against the capstan K, and the tape T is pulled out from the tape reservoir case A1 and then pushed into the tape reservoir case A2. Under the above condition, in the tape reservoir case A2, the tape T is not caused to accumulate as shown by solid line in FIG. 4, but is maintained stretched as shown by phantom line T1, because of the fact that the tape T starts when the tape is tightened as shown by the line T1 as will be mentioned below and both pinch rollers PP and RP are in pressure contact with capstan K with the tape T pinched therebetween and fed at a constant speed. On the other hand, the tape T in the tape reservoir case A1 is accumulated in a slack condition. As the relay RR is energized, its contact RR3 connects the input terminals of amplifier AMP to the microphone jack 23. Contact RR2 is also closed to connect the output of amplifier AMP to the recording head RH through resistance R1 and parallel-connected resistance R2 and capacitor C4. On the other hand, the output voltage of A.C. biasing oscillator OSC is also applied to the recording head RH through capacitor C3 and contact RR2.

Consequently, when the tape T passes through the erasing head EH, the signals that had been recorded on the tape are erased out, and when the tape then passes through the recording head RH, the input signals to the microphone or the like from amplifier AMP are recorded on the tape T. At this time, the contact RR4 is in the open position by virtue of the relay RR being energized, and consequently, any earphone or loudspeaker connected to the jack 25 does not operate.

When the amplified signals from amplifier AMP begin to appear at its output side, this output is applied through resistance R3 to rectifier D1 which rectifies the same to charge the capacitor C1 in the sense shown in FIG. 5. The voltage appearing across the capacitor C1 is applied through resistance R5 to transistor Tr as negative base voltage, and renders the transistor conductive. Then, current flows through the collector and emitter of transistor Tr to energize the relay PR. As a result, contact PR2 is closed to energize the relay QR. As the relay QR is energized, contact QR3 is opened, but since contact PR3 is closed, the relay RR is held energized. When the relay PR is energized, contact PR4 is opened, and the electromagnet PM is deenergized to return the pinch roller PP away from the capstan K. The electromagnet RM is held energized by closed contact RR1. Consequently, the pinch roller RP and capstan K pulls the tape T out of tape reservoir case A1 and pushes the same into tape reservoir case A2, while the input signals are being recorded on the tape by recording head RH, but since the pinch roller PP is kept apart from the capstan K, the tape T is not pulled out from tape reservoir case A2, but is gradually accumulated in a slack condition in the latter as shown in FIG. 5 by a solid line. From the above description, it will be obvious that, upon commencement of the recording operation, that portion of the tape T which has signals just recorded thereon begins automatically to accumulate in the tape reservoir case A2, but is not pulled out of the latter. The apparatus has been in the state of recording operation before the input signals actually case in, and consequently, there is no fear of the force end portion of a series of signals to be recorded being undesirably missed.

When the series of signals being recorded is terminated, the capacitor C1 begins to discharge through resistance R6, emitter and base of transistor Tr and resistance R5. As a result, the capacitor voltage is lowered to raise the base voltage of transistor Tr, and after a certain time interval, determined by the time constant of the circuit, the collector current is cutoff to deenergize the relay PR. Contact PR2 is thus opened, but by virtue of the fact that the tape T is in a slackened state in tape reservoir case A2, the contact S1 of micro-switch 40 is held closed, and since the relay contact QR2 is also closed, the relay QR is held energized. On the other hand, the relay contact PR3 is opened, and contact QR3 is in open position, the relay RR is deenergized to open contact RR1. As a result, the electro-magnet RM is deenergized to return the pinch roller RP away from the capstan K. The deenergization of relay PR closes its contact PR4 to energize the electromagnet PM, which in turn brings the pinch roller PP to pressure contact with the capstan K. Consequently, the tape T lying slack in tape reservoir case A2 is pulled out therefrom and pushed into tape reservoir case A1, passing through the reproducing head PH, whereby the signal recorded on the tape is reproduced. The voltage induced in the reproducing head PH in accordance with the signals recorded on the tape T is applied to amplifier AMP through the now closed contact *b–a*, and the amplified output of amplifier AMP is supplied to the loudspeaker jack 25 through the now closed contact RR4 and volume control resistor VR. At this time, the capacitor C1 is short-circuited by the now closed contacts PR1 and QR1, and consequently, is never charged by the amplifier output. As a result, the transistor Tr is non-conductive, and the relay PR is never energized. Since the relay contact RR2 is held open, the amplifier output and the A.C. bias OSC are not applied to the recording head RH, and there is no fear that the tape will be influenced by recording head RH.

The interval of time from the commencement of recording operation responsive to the beginning of the microphone output to the removal of pinch roller PP away from capstan K is so adjusted that it is shorter than the interval of time required for the tape T to reach the reproducing head PH through the shortest path T1 from the recording head RH, and consequently, that portion of the tape T which carries the beginning end of recorded signals is surely at the side of reproducing head PH nearest to the tape reservoir case A2. Therefore, the record is reproduced surely from its beginning end without excessive delay from the termination of the recording operation.

As the reproducing operation proceeds and when the tape T lying in tape reservoir case A2 has been substantially wholly pulled out therefrom to reach the stretch condition as shown by T1, the guide roller 2 is displaced to the position shown by 9 to actuate the microswitch 40 for opening its contact S1, whereupon the relay QR is cut from D.C. source B1. However, the relay QR is kept energized for a while by the discharge current of the capacitor C2, and after a period of time, determined by the time constant of the circuit, the capacitor voltage drops to a level below which the relay QR returns to the deenergized position. This assures that the record is fully reproduced without missing the tail end portion.

When the relay QR has returned to its normal position, both relays PR and QR are in a deenergized condition, relay RR is energized, and the tape T in tape reservoir case A2 is stretched as shown by T1, all being in the condition ready for the next recording operation.

When the level of input signals is relatively low, or there is a pause in a series of input signals, that is long enough to cause unintended Voice Operation, the Voice Operation changing switch S4 is closed, and a push button switch (not shown) connected to the jack 24 may be operated for Manual Operation of the apparatus.

The resistance R7 is relatively low, and the output of amplifier AMP applied to rectifier D1 through resistance R3 is almost wholly lost in the resistance R7 when the switch S4 is closed. Thus, in effect, there is no input signal supplied to the rectifier D1. The push button switch connected to the remote control jack 24 is pushed during recording operation, and is of such a construction that, when it is pushed, the two contacts of jack 24 are opened apart. For recording operation, when the remote control switch is pushed to open the jack contacts, the negative side of D.C. source B1 is connected to rectifier D1 through resistance R8 and switch S4 to charge the capacitor C1 in the sense shown. This corresponds to the condition ready for recording in the aforementioned Voice Operation.

When the recording operation has terminated, and the push button switch is released, the two contacts of jack 24 come together to short circuit the resistance R7, and there is no voltage applied to rectifier D1 through resistance R8. This corresponds to the condition in Voice Operation of the termination of signals to be recorded, and the capacitor C1 is discharged to deenergize the relay PR. Thus, the apparatus begins the reproducing operation in the manner described in Voice Operation. When the reproducing operation has completed, the micro-switch contact S1 is opened to return the relay QR. The apparatus thus becomes ready for the next recording operation.

When it is desired to effect reproduction of one and the same record for several times repetitively, the continuous reproducing lever 12 is pivoted about its shaft 48 in the direction shown by arrow 49 for about 60 degrees. This causes the erasing head EH to move away from the tape T, and the head becomes ineffective. At the same time, the insulating plate 50 is pushed in the direction shown by arrows 51 to close the switch S2. Under the above condition, when the reproducing operation has completed for one time, and the microswitch contact S1 is opened accordingly, the now closed contact S2 holds the relay QR energized, and the apparatus maintains the reproducing condition.

The illustrated embodiment of the present invention comprises two tape reservoir cases A1 and A2, and the signals recorded on the magnetic tape are erased before the next recording operation is started. However, when it is desired to keep the tape having signals recorded thereon permanently, the present apparatus may be operatively connected with another magnetic recording and reproducing apparatus, or in place of one tape reservoir case A1, a supply reel and a take-up reel of magnetic tape may be provided for feeding the tape through the tape reservoir case A2.

I claim:

1. An automatized magnetic recording and reproducing apparatus for recording a series of signals on an endless magnetic tape selectively passing between first and second tape reservoirs by means of first and second pinch rollers selectively pressing said tape against a driven capstan, accumulating the tape having signals recorded thereon in said first tape reservoir case during recording, and after the termination of recording, pulling out the tape accumulated in said first reservoir case and reproducing said signals recorded thereon, comprising means responsive to the presence of a signal on said tape and operatively connected to control said pinch roller for continuously pulling from said second reservoir case the tape entering therein for preventing the tape from accumulating in said second reservoir case when an input signal is absent during recording operation, and preventing said tape from being pulled out of said first reservoir case when input signals are present allowing the tape to accumulate in said first reservoir case, means for reproducing the signals recorded on the tape accumulated in said first reservoir case, while said tape is being pulled out from said first reservoir case, when input signals are interrupted for more than a predetermined interval of time, means responsive to the termination of reproducing of the recorded signals for conditioning the apparatus to recording operation, and push button means for controlling the recording of signals when said push button switch is depressed and for reproducing the record when said push button switch is released.

2. The automatized magnetic recording and reproducing apparatus according to claim 1, additionally comprising an erasing head, and means for selectively controlling said erasing head, whereby the signal on said magnetic tape may be reproduced repeatedly.

3. The automatized magnetic recording and reproducing apparatus according to claim 1, additionally comprising means including a switch, lever means one end of which is operatively connected to actuate said switch and roller means on the other end of said lever with the tape in contact therewith, responsive to the tensional force of said tape which is being pulled out from said second tape reservoir case during reproducing operation for detecting the fact that the tape is not accumulated in said first reservoir case so as to change the reproducing state into the recording state.

4. The automatized magnetic recording and reproducing apparatus according to claim 1, further comprising means including a capacitor to maintain a reproducing condition for a period of time determined by the time constant of a circuit including said capacitor after the actuation of said tape tension detector.

5. An automatized magnetic apparatus for recording and reproducing a series of signals on an endless magnetic tape selectively passing between first and second tape reservoir cases, accumulating the tape having signals recorded thereon in a second tape reservoir case, and pulling out the tape accumulated in said second reservoir case and reproducing said signals thereon upon the termination of recording comprising means for recording signals on said tape, a continuously driven capstan, first and second pinch roller means selectively actuatable to press said tape against said capstan, means responsive to the presence of signals on said tape to control pulling the tape from said second reservoir case to prevent the tape from accumulating therein when an input signal is absent during recording operations, preventing the pulling out of said tape from the first reservoir case when input signals are present so that the tape accumulates in said first reservoir case, means to reproduce the signals recorded on the tape accumulated in said first reservoir case when the tape is pulled therefrom, said reproducing means being operative when the input signals are interrupted for more than a predetermined interval of time, means responsive to the termination of reproduction of the recorded signals for conditioning the apparatus for recording operation, selectively actuatable manual means for controlling the recording and reproducing of signals, means for erasing the signals from said tape, and means for controlling the tension of said tape during both recording and reproducing operations.

6. An automatic magnetic recording and reproducing apparatus for recording a series of signals on an endless magnetic tape selectively passing between first and second tape reservoirs, accumulating the tape having signals recorded thereon in said second tape reservoir case and pulling out the tape accumulated therein to reproduce said signals recorded thereon, comprising a continuously driven capstan, first and second pinch rollers operatively connected to selectively contact said tape with said capstan to control the movement of said tape between said first and second reservoirs, respectively, means responsive to the presence of a signal on said tape and operatively connected to control said pinch rollers, said responsive means preventing the pulling out of the tape from said second reservoir case when input signals are present whereby the tape is caused to accumulate in said second reservoir case, and when said input signal is absent to pull said tape from said second reservoir case and pass it into said first reservoir case, means for reproducing the signals recorded on the tape as it is pulled from said second reservoir case, and push button means operatively connected to actuate said recording operation upon depressing of said button and said reproducing operation upon release of said button.

References Cited

UNITED STATES PATENTS

| | | | |
|---|---|---|---|
| 3,287,508 | 11/1966 | Morrison | 179—100.2 |
| 3,299,538 | 1/1967 | Cooper | 179—100.2 |
| 3,340,369 | 9/1967 | Seidl | 179—100.2 |
| 3,342,952 | 9/1967 | Meyer | 179—100.2 |
| 3,383,473 | 5/1968 | Schroter | 179—100.2 |

BERNARD KONICK, Primary Examiner

V. P. CANNEY, Assistant Examiner